United States Patent
Sekime et al.

(10) Patent No.: US 6,373,541 B1
(45) Date of Patent: Apr. 16, 2002

(54) REFLECTION TYPE LIQUID CRYSTAL DISPLAY ELEMENT

(75) Inventors: Tomoaki Sekime, Kanazawa; Hisanori Yamaguchi, Ishikawa; Yoshio Iwai, Kanazawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/365,883

(22) Filed: Aug. 3, 1999

(30) Foreign Application Priority Data

Aug. 7, 1998 (JP) .......................... 10-224632

(51) Int. Cl.[7] ..................... G02F 1/1335; G02F 1/1333
(52) U.S. Cl. .................. 349/117; 349/118; 349/113
(58) Field of Search .................. 349/75, 117, 118, 349/186, 96, 109, 113

(56) References Cited

U.S. PATENT DOCUMENTS

| | | | | |
|---|---|---|---|---|
| 4,617,646 A | * | 10/1986 | Yang | 365/108 |
| 4,923,286 A | * | 5/1990 | Grupp | 350/340 |
| 5,061,042 A | * | 10/1991 | Nakamura et al. | 359/63 |
| 5,485,294 A | * | 1/1996 | Sugiyama et al. | 359/58 |
| 5,519,523 A | * | 5/1996 | Madokoro et al. | 359/73 |
| 5,550,661 A | * | 8/1996 | Clark et al. | 359/73 |
| 5,684,551 A | * | 11/1997 | Makamura et al. | 349/99 |
| 5,875,014 A | * | 2/1999 | Kuwabara et al. | 349/117 |
| 5,953,089 A | * | 9/1999 | Hiji et al. | 349/112 |
| 5,982,463 A | * | 11/1999 | Yamaguchi et al. | 349/99 |
| 6,005,651 A | * | 12/1999 | Takahara et al. | 349/137 |
| 6,008,871 A | * | 12/1999 | Okumura | 349/61 |
| 6,081,310 A | * | 6/2000 | Katsuya et al. | 349/113 |
| 6,144,429 A | * | 11/2000 | Nakai et al. | 349/113 |
| 6,147,740 A | * | 11/2000 | Yoshida et al. | 349/165 |
| 6,151,088 A | * | 11/2000 | Higa | 349/99 |
| 6,171,518 B1 | * | 1/2001 | Hikmet et al. | 252/299.01 |
| 6,181,396 B1 | * | 1/2001 | Kanoh et al. | 349/113 |
| 6,224,976 B1 | * | 5/2001 | Takushima et al. | 428/355 R |

FOREIGN PATENT DOCUMENTS

| | | | |
|---|---|---|---|
| JP | 06175125 | | 6/1994 |
| JP | 06301006 | | 10/1994 |
| JP | 06308481 | | 11/1994 |
| JP | 07084252 | | 3/1995 |
| JP | 07146469 | | 6/1995 |
| JP | 407199166 | * | 8/1995 |
| JP | 10161110 | | 6/1998 |
| JP | 411084360 | * | 3/1999 |
| JP | 411295727 | * | 10/1999 |
| JP | 411337935 | * | 12/1999 |

* cited by examiner

Primary Examiner—William L. Sikes
Assistant Examiner—Hoan C Nguyen
(74) Attorney, Agent, or Firm—McDermott, Will & Emery

(57) ABSTRACT

A reflection type liquid crystal display element of normally white type and a reflection type liquid crystal display element of normally black type, both high in brightness and contrast, and capable of changing into black or white achromatically, are obtained. The constitution includes a liquid crystal cell having a first substrate, a second substrate, and a liquid crystal disposed between the first substrate and the second substrate, a light reflecting member disposed at the second substrate side, a polarizing film disposed outside of the first substrate, and an optical retardation film disposed between the polarizing film and the liquid crystal cell, in which the optical retardation film has a retardation value $R_C$, and there is the relation of formula 1 or formula 2 supposing the retardation value of the liquid crystal layer when an effective voltage $V_{on}$ is applied to the liquid crystal cell to be "$R_{on}$", where:

$$R_{on}+R_c=(\lambda/4)+(\lambda/2)\times(m) \qquad \text{Formula 1}$$

$$R_{on}+R_c=(\lambda/2)\times(m+1), \qquad \text{Formula 2}$$

and where "$\lambda$" is the wavelength of light, and "m" is a positive integer including 0.

38 Claims, 6 Drawing Sheets

REFLECTION TYPE LIQUID CRYSTAL DISPLAY ELEMENT

FIELD OF THE INVENTION

The present invention relates to a display device, and more particularly to a reflection type liquid crystal display.

BACKGROUND OF THE INVENTION

The liquid crystal display element is thin and light, and is used widely in various applications including the display of portable type information terminal. The liquid crystal display element itself does not emit light, but is a light receiving element which makes display by changing the light transmission intensity, and hence it can be driven by an effective voltage of several volts. Therefore, having a reflector at the lower side of the liquid crystal display element, the reflection type display device for displaying by reflected light of external light can operate by an extremely small power consumption.

A conventional reflection type color liquid crystal display element comprises a liquid crystal cell having a color filter, and a pair of polarizing films disposed on both sides of this liquid crystal cell. The color filter is provided on one substrate of the liquid crystal cell, and the color filter is formed on this substrate, and a transparent electrode is formed further thereon. By applying a voltage to this liquid crystal cell, the orientation state of the liquid crystal molecules is changed, and by making use of orientation changes of liquid crystal molecules, the light transmissivity of each color filter is changed to present a color display.

The transmissivity of one polarizer is about 45% at maximum, and the transmissivity of polarized light parallel to the absorption axis of polarizing film at this time is about 0%, and the transmissivity of vertical polarized light is about 90%. Therefore, in the reflection type liquid crystal display element using two polarizers, the light is emitted by passing the polarizing film a total of four times. Accordingly, by ignoring the absorption of color filter, the reflectivity is $$(0.9)^4 \times 50\% = 32.8\%$$

and, even in a monochromatic panel, the reflectivity is about 33% at maximum.

To realize a bright display, it has been proposed to use only one polarizing film disposed at the upper side of the liquid crystal cell, and enclose the liquid crystal cell by one polarizing film and a reflector (for example, Japanese Laid-open Patent No. 7-146469, and Japanese Laid-open Patent No. 7-84252). In these prior arts, since the light passes through the polarizing film only twice, by ignoring the absorption of the color filter, the reflectivity is $$(0.9)^2 \times 50\% = 40.5\%$$

and, at maximum, the reflectivity is improved by about 23.5% as compared with the constitution using two polarizing films.

In other prior art disclosed in Japanese Laid-open Patent No. 6-308481, without using color filter, the reflection type color liquid crystal display device for color display is realized by the birefringence of nematic liquid crystal layer of twist orientation of liquid crystal cell and the polarizing film.

Further, Japanese Laid-open Patent No. 6-175125 and Japanese Laid-open Patent No. 6-301006 disclose color liquid crystal display devices for making use of birefringence of liquid crystal layer and phase difference film.

These conventional liquid crystal display devices, however, had the following problems.

In the reflection type liquid crystal display element using two polarizing films, in the case of color display by using a color filter in this element, enough reflectivity for obtaining a sufficient brightness cannot be maintained.

In the reflection type liquid crystal display element using one polarizing film, color display is realized by using a color filter in this element, and the reflectivity is heightened to obtain a sufficient brightness. In this conventional constitution, however, black and white achromatic display is difficult, and in particular the reflectivity is low and black display is difficult.

In the case of the reflection type color liquid crystal display device for color display realized by the birefringence of nematic liquid crystal layer of twist orientation of liquid crystal cell and the polarizing film without using color filter, and the color liquid crystal display device for making use of birefringence of liquid crystal layer and phase difference film, enough reflectivity for obtaining a practical brightness can be maintained if two polarizing films are used, but since the color filter is not composed and color display is realized by using coloring by birefringence, multigradation multicolor display such as 16-gradation 4096-color display or 64-gradation full-color display is difficult in principle, and the color purity and color reproduction range is narrow.

In the reflection type liquid crystal display element of monochromatic display mode, a white reflectivity of white cannot be obtained even in the constitution using two polarizing films.

It is hence an object of the invention to present a reflection type liquid crystal display element bright in white display, high in contrast, and realizing a black and white achromatic display.

SUMMARY OF THE INVENTION

A reflection type liquid crystal display device of the invention comprises:

a liquid crystal cell having a first substrate, a second substrate, and a liquid crystal disposed between the first substrate and the second substrate, a light reflecting member disposed at the second substrate side, a polarizing film disposed outside of the first substrate, and an optical retardation film disposed between the polarizing film and the liquid crystal cell, in which the optical retardation film has a retardation value $R_C$, and there is the relation of formula 1 or formula 2 supposing the retardation value of the liquid crystal layer when an effective voltage $V_{on}$ is applied to the liquid crystal cell to be $R_{on}$.

| | |
|---|---:|
| $R_{on}+R_C=(\lambda/4)+(\lambda/2)\times(m)$ | Formula 1 |
| $R_{on}+R_C=(\lambda/2)\times(m+1)$ | Formula 2 | where ($\lambda$) is the wavelength of light, and (m) is a positive integer including 0.

In this constitution, the white display is bright, and a high contrast is obtained. Moreover, a reflection type liquid crystal display device realizing a black and white achromatic display is obtained.

Figure 1:
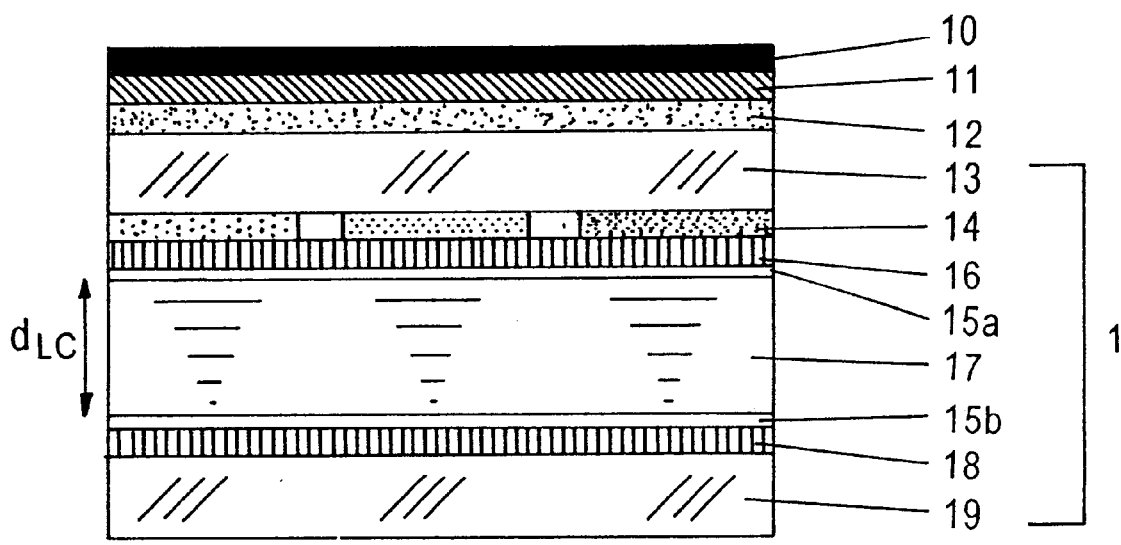
FIG. 1 is a sectional view of a reflection type liquid crystal display element in a first embodiment of the invention.

REFERENCE NUMERALS 1, 4, 7, 8 Liquid crystal cell
10, 30, 50, 60 Polarizing film
11, 31, 51, 61 Polymer film (optical retardation film)
12, 62 Scattering film layer
13, 33, 53, 63 Upper transparent substrate
14, 34, 54, 64 Color filter layer
15a, 15b, 35a, 35b, 55a, 55b, 65a, 65b Orientation layer
16, 36, 56, 66 Transparent electrode
17, 37, 57, 67 Liquid crystal layer
18, 38, 68 Metal reflecting electrode (light reflecting means)
19, 39, 69 Lower substrate
52 Diffusion reflector
59 Lower transparent substrate
70 Gate electrode
71 Source wire
72 TFT element
73 Drain electrode
74 Flattening film
75 Contact hole

DETAILED DESCRIPTION OF THE INVENTION

A reflection type liquid crystal display element in a first aspect of the invention comprises:

a liquid crystal cell having a liquid crystal sealed between a pair of substrates, a polarizing film disposed at one substrate side of this liquid crystal cell, an optical retardation film having a retardation value $R_C$ disposed between this polarizing film and the liquid crystal cell, and light reflecting means disposed at other substrate side.

Preferably, formula 1 or formula 2 is substantially satisfied supposing the retardation value of the liquid crystal layer when an effective voltage $V_{on}$ is applied to the liquid crystal cell to be $R_{on}$.

$$R_{on} + R_C = (\lambda/4) + (\lambda/2) \times (m) \quad \text{Formula 1}$$

$$R_{on} + R_C = (\lambda/2) \times (m+1) \quad \text{Formula 2}$$

where (m) is a positive integer including 0, and ($\lambda$) is the wavelength of light. The retardation value is defined as follows. Supposing the element thickness to be (d), the refractive index to the vibration component advancing more slowly in the element medium to be ($N_s$), and the refractive index to the vibration component advancing faster to be ($N_f$), the relation is $N_s > N_f$. The length of the light corresponding to each component is ($N_s \cdot d$) and ($N_f \cdot d$), and the optical path length difference is $[(N_s - N_f) \cdot d]$, and the difference of phase change is $[2\pi(N_s - N_f)d/\lambda]$. This difference in the phase change of two components is defined to be the retardation value of the phase element.

In such constitution, a normally black reflection type liquid crystal element of bright and black and white achromatic display is obtained. In the case of the constitution not satisfying formula 1 or formula 2, the above effects are slightly inferior.

Preferably, the liquid crystal is a nematic liquid crystal having a positive dielectric constant anisotropy $\Delta\epsilon$, and the value of $R_{on}$ is preferred to satisfy the relation of 10 nm<$R_{on}$≦50 nm. In this constitution, a favorable characteristic of higher contrast is obtained. If the value of $R_{on}$ is out of the specified range, the contrast is slightly inferior.

Preferably, the value of $R_{on}$ satisfies the relation of 20 nm<$R_{on}$≦40 nm. In this constitution, a favorable characteristic of higher contrast is obtained.

Preferably, the liquid crystal is a nematic liquid crystal having a negative dielectric constant anisotropy $\Delta\epsilon$, and the value of $R_{on}$ satisfies the relation of 220 nm<$R_{on}$≦ 260 nm. In this constitution, a favorable characteristic of higher contrast is obtained. If the value of $R_{on}$ is out of the specified range, the contrast is slightly inferior.

Preferably, the value of $R_{on}$ satisfies the relation of 230 nm<$R_{on}$≦250 nm. In this constitution, a favorable characteristic of higher contrast is obtained.

Preferably, the optical retardation film is a polymer film having one or a plurality of optical retardation films. This polymer film is composed of polycarbonate, polyallylate, polysulfone, polyvinyl alcohol, or a member small in the wavelength dispersion of refractive index anisotropy in visible light region. As the member small in the wavelength dispersion of refractive index anisotropy, a member having a wavelength dispersion of a smaller refractive index anisotropy than polycarbonate is preferred. In this constitution, a reflection type liquid crystal display element having a further preferably characteristic is obtained.

Preferably, the Z-coefficient ($Q_Z$) of the polymer film is in a range of about 0.3 to about 1.0. In this constitution, the reflection type liquid crystal display element having a feature of small reflectivity change due to viewing angle is obtained. Herein, ($n_x$), ($n_y$), ($n_z$) are refractive indices in each axial direction in the system of spatial coordinates (x, y, z) in which the normal direction of the film surface is defined as the z-axis, ($n_x$) is the refractive index in the direction of retardation axis, and ($n_y$) is the refractive index in the direction of advancement axis. Herein, ($Q_Z$) is the coefficient expressed as $Q_Z = (n_x - n_z)/(n_x - n_y)$.

Preferably, the liquid crystal cell is a twisted nematic liquid crystal cell, homogeneous liquid crystal cell, homeotropic liquid crystal cell, or hybrid alignment liquid crystal cell having a twist angle of about 0° to about 90°. In this constitution, a favorable characteristic having a higher contrast is obtained. If the twist angle is out of the specified range, the contrast is slightly inferior.

Preferably, the twist angle is about 60° to about 70°. In this constitution, a further preferable characteristic is obtained.

Preferably, a scattering film is disposed at one substrate side. In this constitution, the surrounding light of the panel is focused, and a bright display is obtained. This scattering film is preferred to be disposed between the polymer film and one substrate. In this constitution, blur of display image is suppressed. Further, this scattering film is preferred to be a forward scattering film. The forward scattering film is preferred to be a film having a strong forward scattering characteristic almost free from backward scattering tendency.

Preferably, the light reflecting means has at least one metal selected from aluminum and silver. Further, the light reflecting means is a metal electrode serving also as the electrode of other substrate side.

Preferably, in the case of the liquid crystal display element having the scattering film, the metal electrode has a mirror-smooth surface. In this constitution, disturbance of orientation of liquid crystal is less, and a liquid crystal display element having a natural visual recognition is obtained.

On the other hand, in the case of the reflection type liquid crystal display element not using scattering film, the metal electrode preferably has a scattering film, or the metal electrode itself should have a diffusion reflecting property. The metal electrode having diffusion reflecting property preferably has a rough surface so that the average inclination angle may be about 3° to about 12°. In this constitution, the reflection type liquid crystal display element having a natural visual recognition is obtained.

In other constitution of the reflection type liquid crystal display element, other substrate is a transparent substrate, and light reflecting means such as diffusion reflector is disposed outside of this transparent substrate. As other substrate, a transparent electrode is used. In such constitution, it is preferred to interpose an air layer between the transparent substrate and diffusion reflector. In this constitution, the diffusion effect is further increased.

Preferably, a reflection type color liquid crystal display element disposing a color filter is also possible. In this constitution, changing color from white to black achromatically, for example, a 64-gradation full-color display is realized.

It is also possible to realize a liquid crystal display element of monochromatic mode without using color filter. In this constitution, by the particularly high reflectivity of monochromatic display, a bright reflection type liquid crystal display element is obtained.

Preferably, a nonlinear element is disposed at other substrate side. This constitution realizes a reflection type liquid crystal display element of active matrix type that is driven by a nonlinear element such as TFT in matrix layout. In this case, an insulating flattening film is formed on the nonlinear element, and a contact hole is formed in this flattening film. Through the contact hole, the nonlinear element conducts with the electrode at other substrate side. In this constitution, active driving having a high aperture rate is possible, and a reflection type liquid crystal display element having a high reflectivity is obtained.

Exemplary embodiments of the invention are described below while referring to the drawings.

Exemplary Embodiment 1

FIG. 1 is a sectional view of a reflection type liquid crystal display element in embodiment 1 of the invention. A liquid crystal cell 1 comprises an upper transparent substrate 13, a color filter layer 14, a transparent electrode 16, a first orientation layer 15a, a liquid crystal layer 17, a second orientation layer 15b, a metal reflecting electrode 18, and a lower substrate 19. A scattering film layer 12, a polymer film 11, and a polarizing film layer 10 are disposed outside of the liquid crystal cell.

As the upper transparent substrate 13 and lower substrate 19, an alkali-free glass substrate (for example, 1737 of Corning) is used. The color filter layer 14 is formed on the upper transparent substrate 13 by photolithography, and this color filter layer 14 has red, green and blue colors formed in stripes. The red, green and blue colors are formed by pigment dispersed materials. Thereon, further, the transparent electrode 16 is formed as pixel electrode. The transparent electrode 16 is formed of indium tin oxide. The metal reflecting electrode 18 is formed on the lower substrate 19. The metal reflecting electrode 18 is composed of evaporated titanium of about 300 nm in thickness, and aluminum of about 200 nm in thickness evaporated on the titanium, and it is of mirror reflection type.

The first orientation layer 15a is formed on the transparent electrode 16. The second orientation layer 15b is formed on the metal reflecting electrode 18. These orientation layers 15a and 15b are formed in a step of printing γ-butyrolactone solution dissolving 5 wt. % of polyimide, a step of curing at 250° C., and a step of orientation treatment by rotation rubbing method using a rayon cloth so as to realize a specified twist angle.

The liquid crystal cell 1 was fabricated in the following process:

(a) a step of printing a thermosetting seal resin (for example, Struct Bond of Mitsui Toatsu Chemical) mixing about 1.0 wt. % of glass fiber of specified diameter in the peripheral area on the upper transparent substrate 13, (b) a step of sprinkling resin beads having specified diameter on the lower substrate 19 at a rate of 100 to 200 pieces/mm$^2$, (c) a step of adhering the upper transparent substrate 13 and lower substrate 19 mutually, and curing the seal resin at 150° C., (e) a step of injecting in vacuum a mixed liquid crystal of fluoroester nematic liquid crystal having refractive index anisotropy ($\Delta n_{LC}$) of about 0.08 and chiral liquid crystal, between the upper transparent substrate 13 and lower substrate 19 (this mixed liquid crystal is adjusted to have a chiral pitch of 80 μm), and (f) a step of sealing by an ultraviolet setting resin, and curing this ultraviolet setting resin by irradiation with ultraviolet rays.

On the upper transparent substrate 13 of the liquid crystal cell thus formed, an isotropic forward scattering film was adhered as scattering film layer 12. A polymer film 11 was adhered on the scattering film layer 12 so that the retardation axis may form a specified angle. A polarizing film 10 is adhered to the polymer film 11 so that the absorption axis may form a specified angle. As the polarizing film 10, a neutral gray polarizing film (SQ-1852AP of Sumitomo Chemical Industries) with antiglare (AG) and antireflection (AR) treatment was used.

With an effective voltage of $V_{on}$=5 V applied to the liquid crystal cell, when the retardation value $R_{on}$ of the liquid crystal is 40 nm and the central wavelength (λ) of the light in the visible range (a range from about 380 nm to about 780 nm) is 550 nm, the retardation value $R_C$ of the polymer film was determined so as to satisfy the condition of $R_{on}+R_C=\lambda/4$. That is, $R_C=\lambda/4-R_{on}=550/4-40=138-40=98$. The retardation value $R_C$ of this polymer film is 98 nm. In this constitution, a reflection type liquid crystal display element of normally white mode having a high contrast was realized.

In particular, this polymer film is preferred to be polyvinyl alcohol or a member having wavelength dispersion of small refractive index anisotropy. In this constitution, a reflection type liquid crystal display element of normally white mode having an achromatic black and white display and a high contrast was realized.

The layer thickness of liquid crystal ($d_{LC}$) is 3.0 μm, ($\Delta n_{LC} \cdot d_{LC}$) is 0.24 μm, and the polymer film is composed of two polycarbonate films having the Z-coefficient ($Q_Z$) of 0.5. At this time, the retardation value of the polycarbonate film at the polarizing film side was supposed to be $R_{F1}$, and the retardation value of the polycarbonate film at the liquid crystal cell side to be $R_{F2}$.

At this time, when the effective voltage $V_{on}$=5 V is applied to the liquid crystal cell, the retardation value ($R_{on}$) of the liquid crystal is 40 nm, and in order to satisfy the above condition of $R_{on}+R_C=\lambda/4$, the retardation value $R_C$ ($R_{F1}$, $R_{F2}$) of the polymer film was determined. On the basis of the result, $R_{F1}$=0.235 μm, and $R_{F2}$=0.138 μm were obtained. (These values were determined from the results of both measurement and calculation.) The reference line in the substrate plane was determined as the bisector of the larger angle of the angles formed by the direction of the liquid crystal molecule closest to one substrate and the direction of the liquid crystal molecule closest to other substrate. As seen from one substrate side, the direction of the nematic liquid crystal twisting from one substrate side to other substrate side is defined to be positive. The angle formed by the reference line and the direction of absorption axis of polarizing film is supposed to be ($\phi_P$), and angle formed by the reference line and the direction of retardation axis of polycarbonate film at polarizing film side to be ($\phi_{F1}$), and the angle formed by the reference line and the direction of retardation axis of polycarbonate film at liquid crystal cell side to be ($\phi_{F2}$) The twist angle is supposed to be ($\Omega_{LC}$). In such state, in the condition of $\Omega_{LC}$=63.0°, $\phi_P$=105.0°, $\phi_{F1}$=175.0°, and $\phi_{F2}$=114.0°, a reflection type liquid crystal display element of normally white mode having a high contrast was realized.

In this embodiment, the optical characteristics were measured in this condition. The reflectivity was measured in complete diffusion light source.

Figure 2:
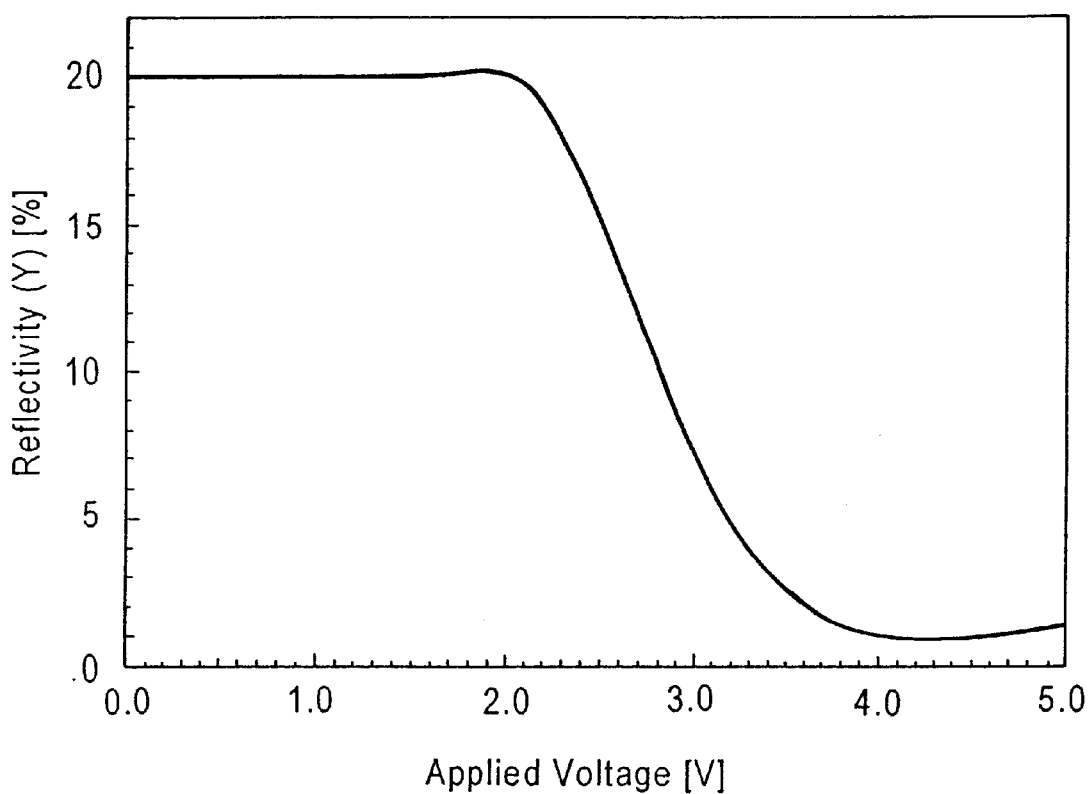
FIG. 2 is a characteristic diagram showing the relation between reflectivity and applied voltage of the reflection type liquid crystal display element in the first embodiment of the invention.

FIG. 2 shows a characteristic diagram showing the relation between reflectivity and applied voltage in the reflection type liquid crystal display element of this embodiment. In the front characteristic, the reflectivity of white converted to Y-value was 20.3%, and the contrast was 21.2. Moreover, because of achromatic change from black to white, a 64-gradation full-color display was realized.

Excluding the color filter layer 14 from the above constitution, a reflection type liquid crystal display element was fabricated. As a result, in the front characteristic, the contrast was 22.3, and the reflectivity of white converted to Y-value was 36.7%.

Still more, by varying the twist angle ($\Omega_{LC}$) of the liquid crystal, the characteristic was investigated. As a result, in the constitution of embodiment 1, when the twist angle was in a range of about 45° to about 90°, a favorable characteristic was obtained. Further, when the twist angle ($\Omega_{LC}$) was in a range of about 0° to about 65°, a particularly favorable characteristic was obtained.

In this constitution, the twisted nematic liquid crystal cell is used as the liquid crystal cell. Not limited to such constitution, the liquid crystal cell may be a homogeneous liquid crystal cell. For example, using polyvinyl alcohol as polymer film, it may be composed to have the retardation value ($R_F$) of 105 nm. Further, the liquid crystal cell may be composed of a hybrid alignment nematic liquid crystal cell. For example, using polyvinyl alcohol as polymer film, it may be composed to have the retardation value ($R_F$) of 110 nm. In such constitution, too, favorable characteristics were obtained same as in the twisted nematic liquid crystal.

In the foregoing constitution, the scattering film layer 12 is disposed between the polymer film 11 and upper transparent substrate 13, but not limited to such constitution, for example, the scattering film layer 12 may be disposed on the polarizing film 10, or the scattering film layer 12 may be disposed between the polarizing film 10 and polymer film 11. In such constitutions, too, the same favorable characteristics were obtained.

In this embodiment, polycarbonate is used as polymer film, but not limited to this, the polymer film may be made of, for example, polyallylate, polysulfone, or polyvinyl alcohol, or other material small in the wavelength dispersion of refractive index anisotropy. In such constitution, too, the same favorable effects were obtained.

In the embodiment, as the reflecting electrode, a metal reflecting electrode containing aluminum as constituent element was used, but not limited to this, for example, a metal reflecting electrode containing silver as constituent element may be also used. In such constitution, too, the same favorable effects were obtained.

In this embodiment, in the case of the liquid crystal display device having a constitution in which the retardation value $R_C$ of the polymer film does not satisfy formula 1, the effects were slightly inferior.

Exemplary Embodiment 2

Figure 3:
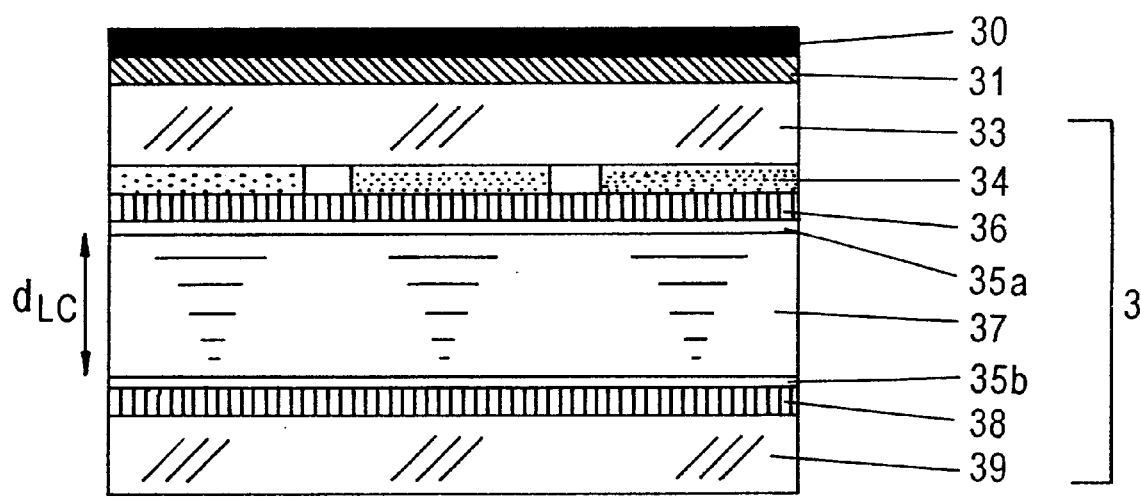
FIG. 3 is a sectional view of a reflection type liquid crystal display element in a second embodiment of the invention.

FIG. 3 is a sectional view of a reflection type liquid crystal display element in embodiment 2 of the invention. A liquid crystal cell 3 comprises an upper transparent substrate 33, a color filter layer 34, a transparent electrode 36, a first orientation layer 35a, a liquid crystal layer 37, a second orientation layer 35b, a metal reflecting electrode 38, and a lower substrate 39. A polymer film 31 and a polarizing film layer 30 are disposed outside of the liquid crystal cell 3. In the display device of embodiment 2, as compared with embodiment 1, scattering film layer is not formed.

As the upper transparent substrate 33 and lower substrate 39, an alkali-free glass substrate (for example, 1737 of Corning) is used. The color filter layer 34 is formed on the upper transparent substrate 33 by photolithography, and this color filter layer 34 has red, green and blue colors formed in stripes. The red, green and blue colors are formed by pigment dispersed materials. Thereon, further, the transparent electrode 36 is formed as pixel electrode. The transparent electrode 36 is formed of indium tin oxide. The metal reflecting electrode 38 is formed on the lower substrate 39. The metal reflecting electrode 38 is composed of evaporated titanium of about 300 nm in thickness, and aluminum of about 200 nm. in thickness evaporated on the titanium. The metal reflecting electrode 38 is of diffusion (scattering) reflection type having a roughened surface so as to have an average inclination angle of 3° to 12°.

The first orientation layer 35a is formed on the transparent electrode 36. The second orientation layer 35b is formed on the metal reflecting electrode 38. These orientation layers 35a and 35b are formed in a step of printing γ-butyrolactone solution dissolving 5 wt. % of polyimide, a step of curing at 250° C., and a step of orientation treatment by rotation rubbing method using a rayon cloth so as to realize a specified twist angle.

The liquid crystal cell 1 was fabricated in the following process:

(a) a step of printing a thermosetting seal resin (for example, Struct Bond of Mitsui Toatsu Chemical) mixing about 1.0 wt. % of glass fiber of specified diameter in the peripheral area on the upper transparent substrate 33, (b) a step of sprinkling resin beads having specified diameter on the lower substrate 39 at a rate of 100 to 200 pieces/mm$^2$, (c) a step of adhering the upper transparent substrate 33 and lower substrate 39 mutually, and curing the seal resin at 150° C., (e) a step of injecting in vacuum a mixed liquid crystal of fluoroester nematic liquid crystal having it refractive index anisotropy ($\Delta n_{LC}$) of about 0.08 and chiral liquid crystal, between the upper transparent substrate 33 and lower substrate 39 (this mixed liquid crystal is adjusted to have a chiral pitch of 80 μm), and (f) a step of sealing by an ultraviolet setting resin, and curing this ultraviolet setting resin by irradiation with ultraviolet rays.

On the upper transparent substrate 33 of the liquid crystal cell thus formed, a polymer film 31 is adhered. A polarizing film 30 is adhered to the polymer film 31 so that the absorption axis may form a specified angle. As the polarizing film 30, a neutral gray polarizing film (SQ-1852AP of Sumitomo Chemical Industries) with antiglare (AG) and antireflection (AR) treatment is used.

The layer thickness of liquid crystal ($d_{LC}$) is 3.0 μm, ($\Delta n_{LC} \cdot d_{LC}$) is 0.24 μm, and the polymer film is composed of one polyvinyl alcohol film having the Z-coefficient ($Q_Z$) of 0.5. When the effective voltage ($V_{on}$) of 5 V is applied to the liquid crystal cell, the retardation value ($R_{on}$) of the liquid crystal is 40 nm, and in order to satisfy the condition of $R_{on}+R_C=\lambda/2$, the retardation value ($R_C=R_F$) of the polymer film was determined. As a result, the retardation value ($R_F$) of this polymer film was 235 nm. At this time, the retardation value of the polyvinyl alcohol was ($R_F$), and the angle formed by the reference line and the direction of retardation axis of the polyvinyl alcohol was ($\phi_F$) The twist angle ($\Omega_{LC}$) was 63.0°. In such state, in the condition of $\phi_P=45.0°$ and $\phi_F=90.0°$, a reflection type liquid crystal display element of normally white mode having a high contrast was realized.

In this embodiment, the optical characteristics were measured in this condition. The reflectivity was measured in complete diffusion light source. In this constitution, a reflection type liquid crystal display element of normally white mode having a high contrast was realized.

Figure 4:
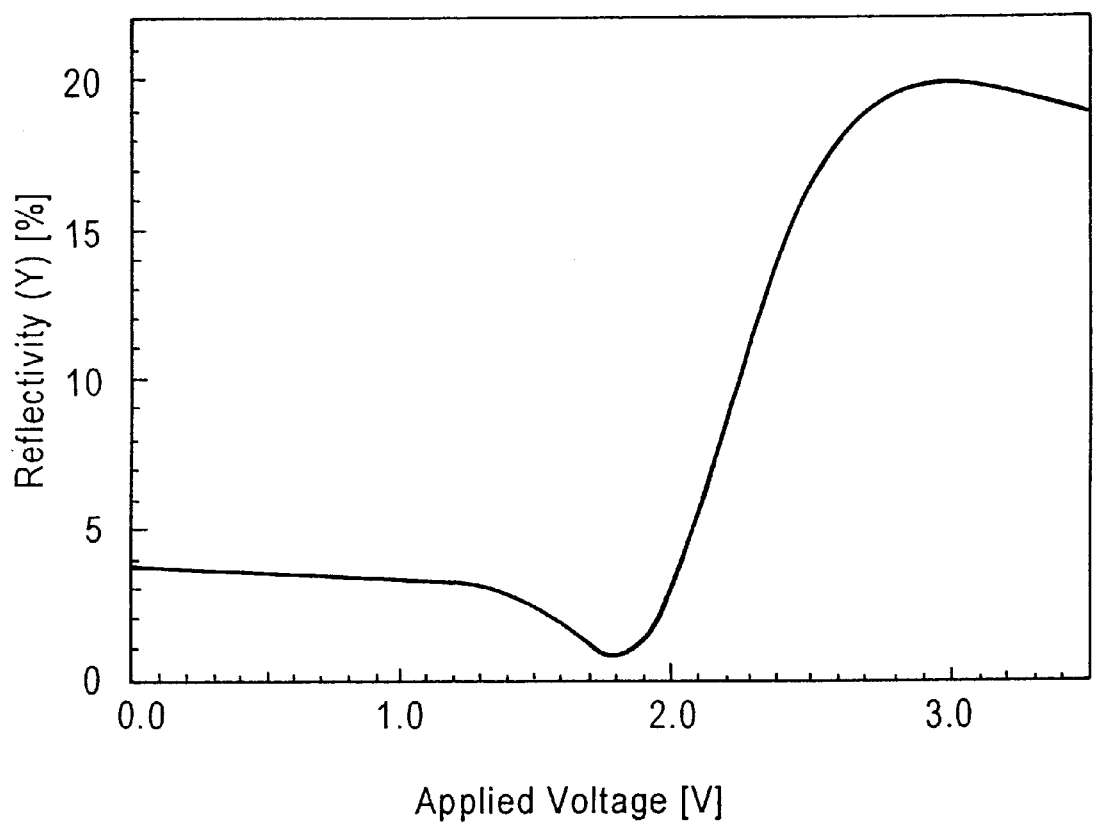
FIG. 4 is a characteristic diagram showing the relation between reflectivity and applied voltage of the reflection type liquid crystal display element in the second embodiment of the invention.

FIG. 4 is a characteristic diagram showing the relation between reflectivity and applied voltage in the reflection type liquid crystal display element of this embodiment. In the front characteristic, the reflectivity of white converted to Y-value was about 20.1%, and the contrast was about 22.3. Moreover, because of achromatic change from black to white, a 64-gradation full-color display was realized.

Excluding the color filter layer 34 from the above constitution, a reflection -type liquid crystal display element was fabricated. As a result, in the front characteristic, the contrast was about 23.1, and the reflectivity of white converted to Y-value was about 35.2%.

Still more, by varying the twist angle ($\Omega_{LC}$) of the liquid crystal, the characteristic was investigated. As a result, when the twist angle was in a range of 45° to 90°, a favorable characteristic was obtained. Further, when the twist angle ($\Omega_{LC}$) was in a range of 60° to 65°, a particularly favorable characteristic was obtained.

In this constitution, the twisted nematic liquid crystal cell is used as the liquid crystal cell, but not limited to this, the following constitutions may be also possible:

(a) the liquid crystal cell is a homogeneous liquid crystal cell; for example, using polyvinyl alcohol film as polymer film, the retardation value ($R_F$) is 240 nm, (b) the liquid crystal cell is a hybrid alignment nematic liquid crystal cell; for example, using polyvinyl alcohol film as polymer film, the retardation value ($R_F$) is 245 nm, and (c) the liquid crystal cell is a homeotropic liquid crystal cell; for example, using polyvinyl alcohol film as polymer film, the retardation value ($R_F$) is 40 nm.

The display device having such constitutions have favorable characteristics same as in the twisted nematic liquid crystal cell.

In this embodiment, polyvinyl alcohol is used as polymer film, but not limited to this, the polymer film may be made of, for example, polyallylate, polysulfone, or polycarbonate, or other material small in the wavelength dispersion of refractive index anisotropy. In such constitution, too, the same favorable effects were obtained.

In the embodiment, as the reflecting electrode, a metal reflecting electrode containing aluminum as constituent element was used, but not limited to this, for example, a metal reflecting electrode containing silver as constituent element may be also used. In such constitution, too, the same favorable effects were obtained.

In this embodiment, in the case of the liquid crystal display device having a constitution in which the retardation value $R_C$ of the polymer film does not satisfy formula 2, the effects were slightly inferior.

Exemplary Embodiment 3

Figure 5:
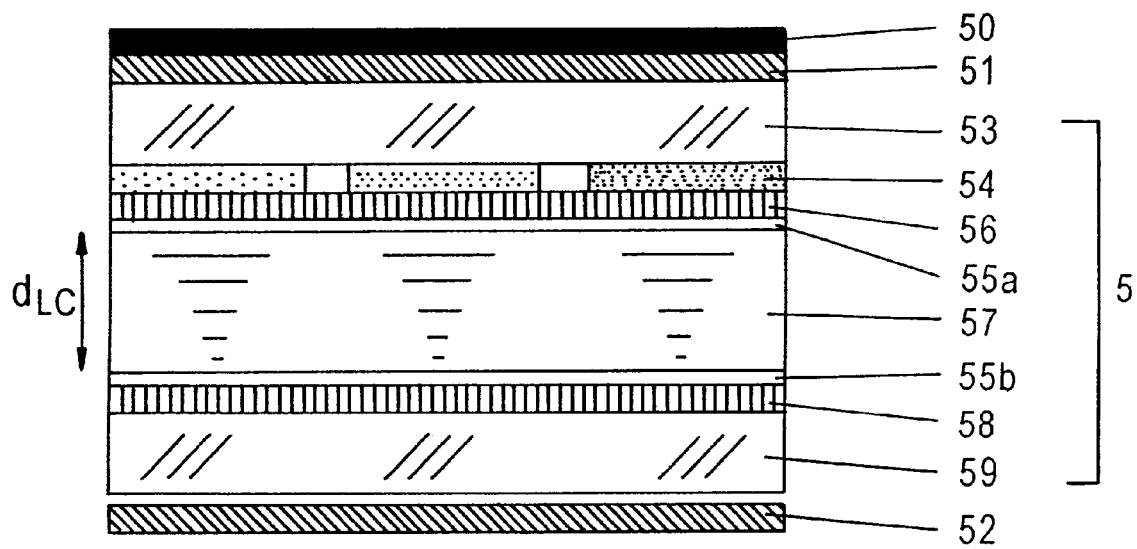
FIG. 5 is a sectional view of a reflection type liquid crystal display element in a third embodiment of the invention.

FIG. 5 is a sectional view of a reflection type liquid crystal display element in other embodiment of the invention. A liquid crystal cell 5 comprises an upper transparent substrate 53, a color filter layer 54, a transparent electrode 56, a first orientation layer 55a, a liquid crystal layer 57, a second orientation layer 55b, a metal reflecting electrode 58, and a lower substrate 59. A polymer film 51 and a polarizing film layer 50 are disposed outside of the liquid crystal cell 5. The diffusion reflector 52 is disposed at the lower side of the lower transparent substrate 59. In the display device of embodiment 3, as compared with embodiment 2, a diffusion reflector 52 is further provided.

As the upper transparent substrate 53 and lower transparent substrate 59, an alkali-free glass substrate (for example, 1737 of Corning) is used. The color filter layer 54 is formed on the upper transparent substrate 53 by photolithography, in stripes of red, green and blue colors. The red, green and blue colors are formed by pigment dispersed materials.

On the color filter layer 54, a first transparent electrode 56 is formed as pixel electrode. A second transparent electrode 58 is formed on the lower transparent substrate 59. These transparent electrodes 56, 58 are formed of indium tin oxide. On each electrode of the first transparent electrode 56 and second transparent electrode 58, γ-butyrolactone solution dissolving 5 wt. % of polyimide is printed, and the coating is cured at 250° C. Then orientation is treated by rotation rubbing method using a rayon cloth so that the formed polyimide layer may realize a specified twist angle. In this way, the first orientation film 55a and second orientation film 55b were formed.

In the peripheral area on the upper transparent substrate 53, a thermosetting seal resin (for example, Struct Bond of Mitsui Toatsu Chemical) mixing about 1.0 wt. % of glass fiber of specified diameter was printed. On the lower substrate 59, resin beads having specified diameter were sprinkled at a rate of 100 to 200 pieces/mm². Further, the upper transparent substrate 53 and lower substrate 59 were mutually adhered, and the seal resin was cured at 150° C. Consequently, a mixed liquid crystal of fluoroester nematic liquid crystal having refractive index anisotropy $\Delta n_{LC}$ of about 0.08 and chiral liquid crystal was injected in vacuum between the upper transparent substrate 53 and lower substrate 59. In this case, this mixed liquid crystal was adjusted to have a chiral pitch of 80 μm. Afterwards, the injection port was sealed by an ultraviolet setting resin, and this ultraviolet setting resin was cured by irradiation with ultraviolet rays.

On the upper transparent substrate 53 of the liquid crystal cell thus formed, a polymer film 51 was adhered, so that the retardation axis might form a specified angle. A polarizing film 50 was adhered to the polymer film 51 so that the absorption axis or transmission axis might form a specified angle. As the polarizing film 50, a neutral gray polarizing film (SQ-1852AP of Sumitomo Chemical Industries) with antiglare (AG) and antireflection (AR) treatment was used.

As the diffusion reflector 52, a silver diffusion reflector was disposed beneath the lower transparent substrate 59.

The layer thickness of liquid crystal ($d_{LC}$) is 3.0 μm, ($\Delta n_{LC} \cdot d_{LC}$) is 0.24 μm, and the polymer film is composed of two polycarbonate films having the Z-coefficient ($Q_Z$) of 0.5. At this time, the retardation value of the polycarbonate film at the polarizing film side was supposed to be $R_{F1}$, and the retardation value of the polycarbonate film at the liquid crystal cell side to be $R_{F2}$.

When the effective voltage $V_{on}$=5 V is applied to the liquid crystal cell, the retardation value ($R_{on}$) of the liquid crystal is 40 nm, and in order to satisfy the condition of $R_{on}+R_C=\lambda/4$, the retardation value $R_C$ ($R_{F1}$, $R_{F2}$) of the polymer film was determined. On the basis of the result, $R_{F1}$=0.235 μm, and $R_{F2}$=0.138 μm were obtained. the twist angle was $\Omega_{LC}$. In such state, in the condition of $\Omega_{LC}$=63.0°, $\phi_P$=105.0°, $\phi_{F1}$=175.0°, and $\phi_{F2}$=114.0°, a reflection type liquid crystal display element of normally white mode having a high contrast was realized. In this embodiment, the optical characteristics were measured in this condition. The reflectivity was measured in complete diffusion light source.

In the front characteristic, the reflectivity of white converted to Y-value was about 19.5%, and the contrast was about 19.1. Moreover, because of achromatic change from black to white, a 64-gradation full-color display was realized.

Excluding the color filter layer 54 from the above constitution, a reflection type liquid crystal display element was fabricated. As a result, in the front characteristic, the contrast was about 20.1, and the reflectivity of white converted to Y-value was about 33.5%.

Incidentally, in the diffusion reflector 52 is disposed beneath the lower transparent substrate 59, if not adhered perfectly by adhesive, when there is an air layer between the diffusion reflector 52 and lower transparent substrate 59, due to the difference between the resin refractive index of 1.6 and air refractive index of 1.0, the diffusion effect is enlarged, and a more natural viewing angle characteristic is obtained.

In the embodiment, silver is used as the diffusion reflector, but not limited to this, the diffusion reflector may be made of aluminum. In this constitution, too, the same favorable effects were obtained.

In this embodiment, in the case of the liquid crystal display device having a constitution in which the retardation value $R_C$ of the polymer film does not satisfy formula 1, the effects were slightly inferior.

Exemplary Embodiment 4

Figure 6:
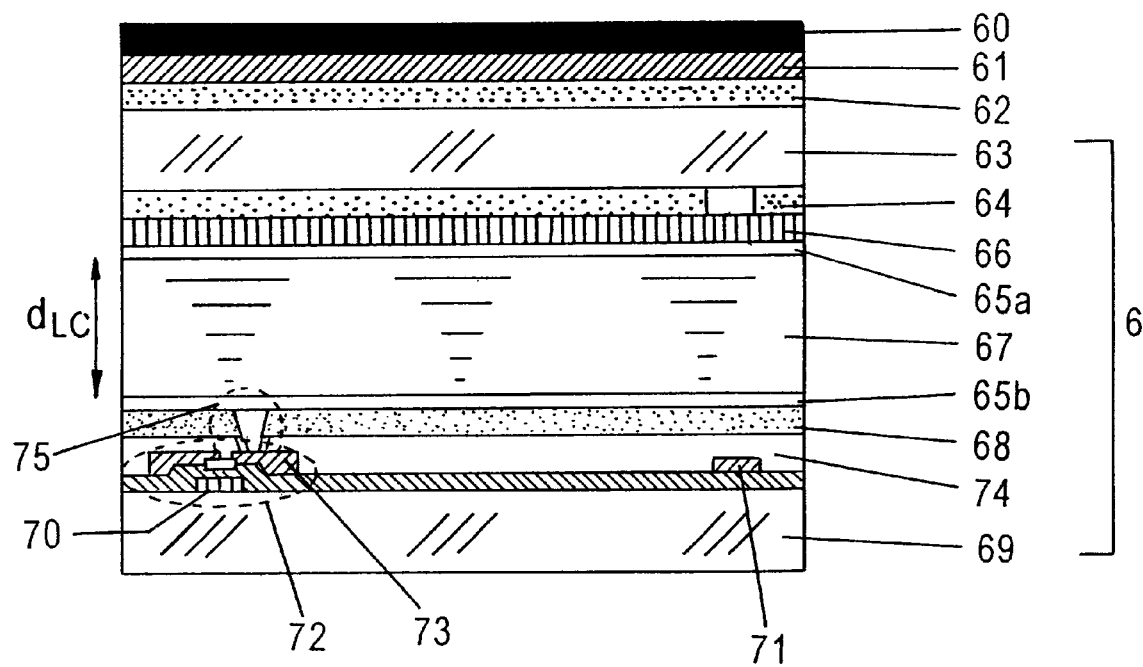
FIG. 6 is a sectional view of a reflection type liquid crystal display element in a fourth embodiment of the invention.

FIG. 6 is a sectional view of a reflection type liquid crystal display element in a different embodiment of the invention. A liquid crystal cell 6 comprises an upper transparent substrate 63, a color filter layer 64, a transparent electrode 66, a first orientation layer 65a, a liquid crystal layer 67, a second orientation layer 65b, a metal reflecting electrode 68, a lower substrate 69, a thin film transistor element (TFT) 72, and a flattening film 74. The thin film transistor element 72 includes a gate electrode 70, a source electrode 71, and a drain electrode 73. A contact hole 75 is formed in the metal reflecting electrode 68. The thin film transistor element 72 has a role as a nonlinear switching element (nonlinear element) 72. A scattering film layer 62, a polymer film 61 and a polarizing film layer 60 are disposed outside of the liquid crystal cell 6.

What differs from embodiment 1 or embodiment 2 is that the metal reflecting electrode substrate 68 is conducting with the nonlinear switching element 72 beneath the flattening film 74 through the contact hole 75. Thus, the display device of the embodiment is a reflection type liquid crystal display device of active drive.

As the upper transparent substrate 63 and lower transparent substrate 69, an alkali-free glass substrate (for example, 1737 of Corning) is used. The color filter layer 64 is formed on the upper transparent substrate 63 by photolithography, in stripes of red, green and blue colors. The red, green and blue colors are formed by pigment dispersed materials.

On the color filter layer 64, a transparent electrode 66 is formed as pixel electrode. This transparent electrode 66 is formed of indium tin oxide.

On the lower substrate 69, the gate electrode 70 made of aluminum and tantalum, source electrode 71 made of titanium and aluminum, and drain electrode 73 are formed in matrix by a specified method. At each intersection of the gate electrode 70 and source electrode 71, the TFT element 72 composed of amorphous silicon is formed.

Thus, on the entire surface on the lower substrate 69 thus forming the nonlinear element, a positive type photosensitive acrylic resin (for example, FVR of Fuji Chemical Industries) is applied, and the flattening film 74 is formed. Later, by the use of specified photo mask and irradiation with ultraviolet rays, the contact hole 75 is formed on the drain electrode 73. Further thereon, titanium is evaporated in a thickness of 300 nm, and aluminum is evaporated further on in a thickness of 200 nm. Thus, a metal reflecting electrode 68 of mirror reflection type was formed.

On each electrode of the transparent electrode 66 and metal reflecting electrode 68, γ-butyrolactone solution dissolving 5 wt. % of polyimide is printed, and the coating is cured at 250° C. The cured polyimide layer is oriented by rotation rubbing method using a rayon cloth. In this way, the first orientation film 65a and second orientation film 65b having a specified twist angle are formed.

In the peripheral area on the upper transparent substrate 63, a thermosetting seal resin (for example, Struct Bond of Mitsui Toatsu Chemical) mixing 1.0 wt. % of glass fiber of specified diameter was printed. On the lower substrate 69, resin beads having specified diameter were sprinkled at a rate of 100 to 200 pieces/mm². Further, the upper transparent substrate 63 and lower substrate 69 were mutually adhered. Then the seal resin was cured at 150° C. Consequently, a mixed liquid crystal of fluoroester nematic liquid crystal having refractive index anisotropy ($\Delta n_{LC}$) of 0.08 and chiral liquid crystal was injected in vacuum between the upper transparent substrate 63 and lower substrate 69. Afterwards, the opening was sealed by an ultraviolet setting resin, and this ultraviolet setting resin was cured by irradiation with ultraviolet rays.

On the upper transparent substrate 63 of the liquid crystal cell thus formed, an isotropic forward scattering film is adhered as scattering. film layer 62. A polymer film 61 was adhered on the scattering film layer 62, so that the retardation axis might form a specified angle. A polarizing film 60 was adhered to the polymer film 61 so that the absorption axis or transmission axis might form a specified angle. As the polarizing film 60, a neutral gray polarizing film (SQ-1852AP of Sumitomo Chemical Industries) with antiglare (AG) and antireflection (AR) treatment was used.

The layer thickness of liquid crystal ($d_{LC}$) is 3.0 μm, ($\Delta n_{LC} \cdot d_{LC}$) is 0.24 μm, and the polymer film is composed of two polycarbonate films having the Z-coefficient ($Q_Z$) of 0.5. At this time, the retardation value of the polycarbonate film at the polarizing film side was supposed to be $R_{F1}$, and the retardation value of the polycarbonate film at the liquid crystal cell side to be $R_{F2}$.

When the effective voltage ($V_{on}$) of 5 V is applied to the liquid crystal cell, the retardation value ($R_{on}$) of the liquid crystal is 40 nm, and in order to satisfy the condition of $R_{on}+R_C=\lambda/4$, the retardation value $R_C$ ($R_{F1}$, $R_{F2}$) of the polymer film was determined. On the basis of the result, $R_{F1}=0.235$ μm, and $R_{F2}=0.138$ μm were obtained. The twist angle was $\Omega_{LC}$. In such state, in the condition of $\Omega_{LC}=\mathbf{63.0°}$, $\phi_P=105.0°$, $\phi_{F1}=175.0°$, and $\phi_{F2}=114.0°$, a reflection type liquid crystal display element of normally white mode having a high contrast was realized.

The liquid crystal display device of this constitution was driven actively. As a result, a 64-gradation full-color display was realized. By the constitution of forming the metal reflecting electrode on the metal reflecting electrode, the aperture rate was 97%. In the front characteristic, the reflectivity of white converted to Y-value was about 22.8%, and the contrast was about 21.7.

In this embodiment, in the case of the liquid crystal display device having a constitution in which the retardation value $R_C$ of the polymer film does not satisfy formula 1, the effects were slightly inferior.

In the foregoing embodiments, by the constitution of forming the nonlinear element such as TFT on the lower substrate, the reflection type liquid crystal display element of active drive can be obtained according to the same method as in this embodiment. The nonlinear element is not limited to TFT of amorphous silicon, but two-terminal element (MIM and thin film diode, etc.), polysilicon TFT and others may be used. In such constitution, too, the same effects are obtained.

As described herein, by the reflection type liquid crystal display element, the invention realizes a reflection type liquid crystal display element of normally white type and a reflection type liquid crystal display element of normally black type, both high in brightness and contrast, and capable of changing into black or white achromatically.

What is claimed is:

1. A reflection type liquid crystal display element comprising:
    a liquid crystal cell having a first substrate, a second substrate, and a liquid crystal disposed between said first substrate and said second substrate,
    a light reflecting member disposed at a side of said second substrate,
    a polarizing film disposed outside of said first substrate, and
    an optical retardation film disposed between said polarizing film and said liquid crystal cell,
    wherein said optical retardation film has a retardation value "$R_C$", and
    wherein there is a relation of formula 1 having a retardation value of the liquid crystal when an effective voltage "$V_{on}$" is applied to said liquid crystal cell to be "$R_{on}$", $$R_{on}+R_c=(\lambda/4)+(\lambda/2)\times(m) \qquad \text{Formula 1}$$

where "$\lambda$" is the wavelength of light, and "m" is a positive integer including 0, and
    wherein said light reflecting member has a metal electrode, said metal electrode has a rough surface with a mean inclination angle in a range from about 3° to about 12°, and said metal electrode diffuses and reflects an incident light.

2. A reflection type liquid crystal display element comprising:
    a liquid crystal cell having a first substrate, a second substrate, and a liquid crystal disposed between said first substrate and said second substrate,
    a light reflecting member disposed at a side of said second substrate,
    a polarizing film disposed outside of said first substrate, and
    an optical retardation film disposed between said polarizing film and said liquid crystal cell,
    wherein said optical retardation film has a retardation value "$R_C$", and
    wherein there is a relation of formula 2 having the retardation value of the liquid crystal layer when an effective voltage "$V_{on}$" is applied to said liquid crystal cell to be "$R_{on}$", $$R_{on}+R_c=(\lambda/2)\times(m+1) \qquad \text{Formula 2}$$

where "$\lambda$" is a wavelength of light, and "m" is a positive integer including 0, and
    wherein said light reflecting member has a metal electrode, said metal electrode has a rough surface with a mean inclination angle in a range from about 3° to about 12°, and said metal electrode diffuses and reflects an incident light.

3. A reflection type liquid crystal display element of claim 1, wherein said liquid crystal is a nematic liquid crystal having a positive dielectric constant anisotropy "$\Delta\in$", and said "$R_{on}$" is in a range of formula 3, $$10 \text{ nm}<R_{on}\leq 50 \text{ nm} \qquad \text{Formula 3.}$$

4. A reflection type liquid crystal display element of claim 2, wherein said liquid crystal is a nematic liquid crystal having a positive dielectric constant anisotropy "$\Delta\in$", and said "$R_{on}$" is in a range of formula 3, $$10 \text{ nm}<R_{on}\leq 50 \text{ nm} \qquad \text{Formula 3.}$$

5. A reflection type liquid crystal display element of claim 1, wherein said liquid crystal is a nematic liquid crystal having a negative dielectric constant anisotropy "$\Delta\in$", and said "$R_{on}$" is in a range of formula 5, $$220 \text{ nm}<R_{on}\leq 260 \text{ nm} \qquad \text{Formula 5.}$$

6. A reflection type liquid crystal display element of claim 2, wherein said liquid crystal is a nematic liquid crystal having a negative dielectric constant anisotropy "$\Delta\in$", and said "$R_{on}$" is in a range of formula 5, $$220 \text{ nm}<R_{on}\leq 260 \text{ nm} \qquad \text{Formula 5.}$$

7. A reflection type liquid crystal display element of claim 1, wherein said optical retardation film has a polymer film having a wavelength dispersion of smaller refractive index anisotropy than polycarbonate.

8. A reflection type liquid crystal display element of claim 2, wherein said optical retardation film has a polymer film having a wavelength dispersion of smaller refractive index anisotropy than polycarbonate.

9. A reflection type liquid crystal display element of claim 1, wherein said optical retardation film has at least one polymer film selected from the group consisting of polycarbonate, polyallylate, polysulfone, and polyvinyl alcohol.

10. A reflection type liquid crystal display element of claim 2, wherein said optical retardation film has at least one polymer film selected from the group consisting of polycarbonate, polyallylate, polysulfone, and polyvinyl alcohol.

11. A reflection type liquid crystal display element of claim 1, wherein said optical retardation film has a polymer film, a Z-coefficient of said polymer film to be "$Q_z$", a refractive index in a Z-axis direction in a spatial system of coordinates having a normal direction of a film surface of said polymer film defined as a z-axis to be "$n_z$", a refractive index in an advancement axis direction of a Y-axis direction to be "$n_y$", a refractive index in a retardation axis direction of a X-axis direction to be "$n_x$", "$Q_Z$" is a coefficient expressed as $(n_x-n_z)/(n_x-n_y)$, and is in a range of about 0.3 to about 1.0.

12. A reflection type liquid crystal display element of claim 2, wherein said optical retardation film has a polymer film, a Z-coefficient of said polymer film to be $Q_Z$, a refractive index in a Z-axis direction in a spatial system of coordinates having a normal direction of a film surface of said polymer film defined as a z-axis to be "$n_z$", a refractive index in a advancement axis direction of a Y-axis direction to be "$n_y$", a refractive index in a retardation axis direction of a X-axis direction to be "$n_x$", "$Q_Z$" is a coefficient expressed as $(n_x-n_z)/(n_x-n_y)$, and is in a range of about 0.3 to about 1.0.

13. A reflection type liquid crystal display element of claim 1, wherein said liquid crystal cell is a liquid crystal cell having a twisted nematic liquid crystal, and said liquid crystal cell has a twist angle in at least one range of 0° to 90° and 60° to 70°.

14. A reflection type liquid crystal display element of claim 2, wherein said liquid crystal cell is a liquid crystal cell having a twisted nematic liquid crystal, and said liquid crystal cell has a twist angle in at least one range of 0° to 90° and 60° to 70°.

15. A reflection type liquid crystal display element of claim 1, wherein said liquid crystal cell has at least one selected from the group consisting of homogeneous liquid crystal cell, homeotropic liquid crystal cell, and hybrid alignment nematic liquid crystal cell.

16. A reflection type liquid crystal display element of claim 2, wherein said liquid crystal cell has at least one selected from the group consisting of homogeneous liquid crystal cell, homeotropic liquid crystal cell, and hybrid alignment nematic liquid crystal cell.

17. A reflection type liquid crystal display element of claim 1, further comprising a scattering film disposed outside of said liquid crystal cell.

18. A reflection type liquid crystal display element of claim 2, further comprising a scattering film disposed outside of said liquid crystal cell.

19. A reflection type liquid crystal display element of claim 1, further comprising a scattering film disposed between said retardation film and said first substrate.

20. A reflection type liquid crystal display element of claim 2, further comprising a scattering film disposed between said retardation film and said first substrate.

21. A reflection type liquid crystal display element of claim 1, further comprising a forward scattering film disposed outside of said liquid crystal cell.

22. A reflection type liquid crystal display element of claim 2, further comprising a forward scattering film disposed outside of said liquid crystal cell.

23. A reflection type liquid crystal display element of claim 1, wherein said light reflecting member is a metal electrode containing at least one metal of aluminum and silver.

24. A reflection type liquid crystal display element of claim 2, wherein said light reflecting member is a metal electrode containing at least one metal of aluminum and silver.

25. A reflection type liquid crystal display element of claim 1, wherein said light reflecting member is a metal electrode containing at least one metal of aluminum and silver, and said metal electrode has a mirror-smooth surface.

26. A reflection type liquid crystal display element of claim 2, wherein said light reflecting member is a metal electrode containing at least one metal of aluminum and silver, and said metal electrode has a mirror-smooth surface.

27. A reflection type liquid crystal display element of claim 1, wherein said light reflecting member has a metal electrode and a scattering film disposed on a surface of said electrode.

28. A reflection type liquid crystal display element of claim 2, wherein said light reflecting member has a metal electrode and a scattering film disposed on a surface of said electrode.

29. A reflection type liquid crystal display element of claim 1, further comprising a light reflecting member disposed outside of said second substrate, wherein said second substrate is a transparent substrate.

30. A reflection type liquid crystal display element of claim 2, further comprising a light reflecting member disposed outside of said second substrate, wherein said second substrate is a transparent substrate.

31. A reflection type liquid crystal display element of claim 1, further comprising a light reflecting member disposed outside of said second substrate, and an air layer formed between said second substrate and said light reflecting member, wherein said second substrate is a transparent substrate.

32. A reflection type liquid crystal display element of claim 2, further comprising a light reflecting member disposed outside of said second substrate, and an air layer formed between said second substrate and said light reflecting member, wherein said second substrate is a transparent substrate.

33. A reflection type liquid crystal display element of claim 1, wherein said liquid crystal cell has further a color filter disposed at a side of said first substrate.

34. A reflection type liquid crystal display element of claim 2, wherein said liquid crystal cell has further a color filter disposed at a side of said first substrate.

35. A reflection type liquid crystal display element of claim 1, wherein said liquid crystal cell has further a nonlinear element disposed at a side of said second substrate.

36. A reflection type liquid crystal display element of claim 2, wherein said liquid crystal cell has further a nonlinear element disposed at a side of said second substrate.

37. A reflection type liquid crystal display element of claim 1,
wherein said liquid crystal cell has a nonlinear element disposed at a side of said second substrate, and an insulating flattening film disposed on said nonlinear element,
said flattening film has a contact hole,
said light reflecting member has a metal electrode, and
said nonlinear element and said metal electrode conduct to each other through said contact hole.

38. A reflection type liquid crystal display element of claim 2, wherein said liquid crystal cell has a nonlinear element disposed at a side of said second substrate, and an insulating flattening film disposed on said nonlinear element, said flattening film has a contact hole, said light reflecting member has a metal electrode, and said nonlinear element and said metal electrode conduct to each other through said contact hole.

* * * * *